(12) United States Patent
Tonelli et al.

(10) Patent No.: US 11,185,188 B2
(45) Date of Patent: Nov. 30, 2021

(54) MACHINE FOR COOKING BREAD

(71) Applicant: BITFOOD S.R.L., Milan (IT)

(72) Inventors: Mauro Tonelli, Milan (IT); Luca Tonelli, Milan (IT)

(73) Assignee: BITFOOD S.R.L., Milan (IT)

(*) Notice: Subject to any disclaimer, the term of this patent is extended or adjusted under 35 U.S.C. 154(b) by 390 days.

(21) Appl. No.: 16/313,570

(22) PCT Filed: Jun. 28, 2017

(86) PCT No.: PCT/IB2017/053868
§ 371 (c)(1),
(2) Date: Dec. 27, 2018

(87) PCT Pub. No.: WO2018/002840
PCT Pub. Date: Jan. 4, 2018

(65) Prior Publication Data
US 2019/0167037 A1    Jun. 6, 2019

(30) Foreign Application Priority Data

Jun. 29, 2016 (IT) .......................... UA2016A004761

(51) Int. Cl.
*A47J 37/06* (2006.01)
(52) U.S. Cl.
CPC .... *A47J 37/0611* (2013.01); *A47J 2037/0617* (2013.01)
(58) Field of Classification Search
CPC .................. A47J 2037/0617; A47J 37/0611
(Continued)

(56) References Cited

U.S. PATENT DOCUMENTS 2,922,357 A * 1/1960 Gerard ................. A47J 37/0611
99/379
4,054,086 A * 10/1977 McNair ................. A47J 37/0611
99/374
(Continued)

FOREIGN PATENT DOCUMENTS

| CH | 707 388 A2 | 6/2014 |
| DE | 30 04 053 A1 | 8/1981 |
| FR | 2 126 219 A1 | 10/1972 |

OTHER PUBLICATIONS

International Search Report dated Oct. 13, 2017 in corresponding International application No. PCT/IB2017/053868; 3 pages.
(Continued)

*Primary Examiner* — Reginald Alexander
(74) *Attorney, Agent, or Firm* — Maier & Maier, PLLC

(57) ABSTRACT

An appliance for cooking food including an upper heating plate and a lower heating plate provided with surfaces facing each other. The upper plate being movable between a closed position in which the upper and the lower plates are in contact with each other and an open position in which the upper and the lower heating plates are spaced apart. The appliance further includes parallelogram linkage constrained to the upper plate and to the lower plate to allow the upper plate to be lifted from or to approach in a parallel manner the lower plate. The appliance further includes one or more cavities for housing food to be cooked at least at one of said surfaces and at least one vent channel to put one or more cavities in fluid communication with an environment external to the appliance when plates are in the closed position.

10 Claims, 4 Drawing Sheets

(58) Field of Classification Search
USPC .................................. 99/372, 379, 380, 440
See application file for complete search history.

(56) References Cited

U.S. PATENT DOCUMENTS

| | | | | |
|---|---|---|---|---|
| 4,662,273 | A * | 5/1987 | Marchioni | A47J 37/0676 |
| | | | | 219/386 |
| 5,640,895 | A | 6/1997 | Anetsberger | |
| 2004/0123744 | A1 * | 7/2004 | Bobo | A47J 37/0611 |
| | | | | 99/374 |
| 2008/0178746 | A1 * | 7/2008 | Rosset | A47J 37/0611 |
| | | | | 99/380 |
| 2009/0308260 | A1 * | 12/2009 | Trost | A47J 37/0611 |
| | | | | 99/349 |
| 2019/0167036 | A1 * | 6/2019 | Pool, III | A47J 37/0611 |

OTHER PUBLICATIONS

Written Opinion of the International Searching Authority dated Oct. 13, 2017 in corresponding International application No. PCT/IB2017/053868; 5 pages.

* cited by examiner

MACHINE FOR COOKING BREAD

FIELD

The present invention relates to the field of food cooking appliances, particularly of the type with two heating plates for cooking food placed therebetween. The present invention particularly relates to appliances with two heating plates for cooking food.

BACKGROUND

Appliances for heating and/or cooking food, such as for example toasters and electric grills, are appliances typically provided with two plates with heating surfaces, of which at least one plate is movable. Heating surfaces, in use, face each other and transfer heat, mainly by thermal conduction, necessary for cooking food that, to this end, is in contact with both of them.

One of the main drawbacks of such appliances is their uniformity in cooking food since the most widespread plate positioning systems provide a hinge connecting corners or edges of the plates and it allows them to rotate with respect to each other. Thus food proximal to the hinge enters in contact with heating plates at such pressure and cooking temperatures different from food placed distal from the hinge.

A solution intended to overcome such drawback is known from the American patent application U.S. Pat. No. 5,640,895A that discloses the use of a parallelogram linkage system that connects the two plates and allows them to accomplish a relative movement such that heating surfaces are always parallel to each other.

However such solution does not guarantee a suitable cooking uniformity, since when cooking food and above all leavened food such as for example bread, it changes its volume and emits gases, resulting in an undesired change in pressure and temperature conditions in the area between the two plates.

SUMMARY

It is the object of the present invention to overcome prior art drawbacks.

Particularly it is the object of the present invention to provide an appliance for cooking food with high cooking uniformity characteristics.

These and other objects of the present invention are achieved by a food cooking appliance embodying the characteristics of the annexed claims, which are an integral part of the present description.

The idea at the base of the present invention is to provide a food cooking appliance comprising an upper heating plate and a lower heating plate, provided with surfaces facing each other. The upper heating plate is movable between a closed position where upper and lower heating plates are in contact and an open position where upper and lower heating plates are spaced from each other. The appliance further comprises linkage means constrained to the upper heating plate and lower heating plate, to allow the upper heating plate to be lifted from or to approach in a parallel manner the lower heating plate. The appliance further comprises one or more cavities for housing food to be cooked at least at one of the facing surfaces and at least one vent channel intended to put one or more cavities in fluid communication with an environment outside the appliance, when the plates are in the closed position. Linkage means further comprise opening means configured for operating the linkage means and for moving the plates away from each other such to allow the cavities to be opened towards the external environment when gas pressure inside said cavities exceeds a threshold value.

Preferably linkage means are parallelogram linkage means and opening means comprise a variable calibration spring.

Such solution allows cooking uniformity of a food cooking appliance to improve, since opening means, for example the resistance offered by the spring that can be calibrated (or adjusted) allows the upper plate to be lifted in a substantially parallel manner relative to the lower plate upon reaching a threshold cooking condition value, preferably a pressure and/or temperature threshold value reached by cooking gases inside cavities. Thus it is possible to maintain, inside the cavities, pressure and temperature conditions allowing food therein to be uniformly cooked.

The present invention further relates to a method for cooking food in cooking chambers formed by coupling two heating plates at least one of them being movable relative to the other one, comprising the step of opening said chambers towards an external environment by moving the two plates away from each other while maintaining them substantially parallel, said step being performed upon reaching a pressure threshold value inside the chambers.

Further advantageous characteristics of the present invention will be more clear from the description below and from the annexed claims, which are an integral part of the present invention.

BRIEF DESCRIPTION OF THE DRAWINGS

The invention will be described here below with reference to non limitative examples provided by way of example and not as a limitation in the annexed drawings. These drawings show different aspects and embodiments of the present invention and, where appropriate, reference numerals showing like structures, components, materials and/or elements in different figures are denoted by like reference numerals.

DETAILED DESCRIPTION OF THE INVENTION

While the invention is susceptible of various modifications and alternative forms, some non-limitative embodiments, provided by way of example, are described in details herein below.

It should be understood, however, that there is no intention to limit the invention to the specific disclosed embodiments but, on the contrary, the invention intends to cover all the modifications, alternative forms and equivalents that fall within the scope of the invention as defined in the claims.

Therefore, in the description below the use of "for example", "etc.", "or" denotes non-exclusive alternatives without limitation, unless otherwise noted; the use of "also" means "among which, but not limited to", unless otherwise defined; the use of "includes/comprise" means "includes/ comprises, but not limited to", unless otherwise noted.

Figure 1:
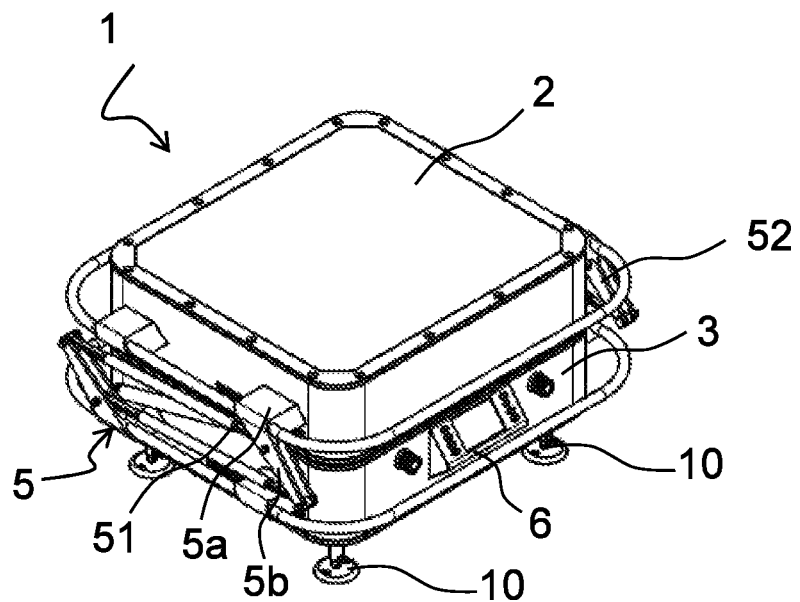
FIG. 1 is a general view in closed condition of the food cooking appliance according to the present invention.
Figure 2:
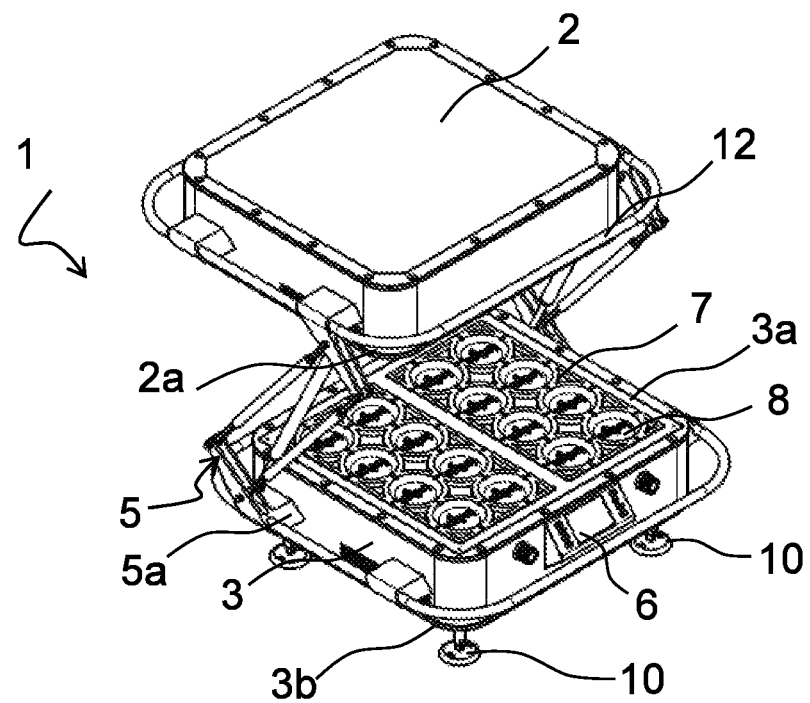
FIG. 2 is a general view in open condition of the food cooking appliance according to the present invention.

FIGS. 1 and 2 show a general view of a food cooking appliance 1 according to the invention. Preferably, but not as a limitation, the appliance is intended to cook food products containing yeast, as for example bread and bakery products.

Having said that, more generally, the appliance 1 comprises an upper heating plate 2 and a lower heating plate 3, connected by parallelogram linkage means. The upper heating plate 2 is movable and linkage means allow the upper plate 2 to move relative to the lower plate 3 such that plates 2, 3 are always maintained substantially parallel to each other.

Particularly the lower plate 3 has a first cooking surface 3a facing a second cooking surface 2a of the upper plate 2. The upper plate 2 is movable between a closed position (see FIG. 1) where peripheral edges of the faced surfaces of the two plates 2,3 are in contact and match with each other, and an open position (see FIG. 2) where the upper heating plate 2 and lower heating plate 3 are spaced from each other and not in direct contact with each other.

In a preferred embodiment, the parallelogram linkage means allow, in the open condition, the upper plate 2 to perform a maximum translation for a distance of 500 mm along a vertical direction with respect to the plane containing the lower plate 3, and allow the upper plate 2 to perform a maximum horizontal translation for 300 mm with respect to the lower plate 3.

In the embodiment described in the figures, the two plates 2, 3 have a substantially right prism with square base geometry, however in different variants, such geometry can be different, for example with a rectangular base. Moreover in the figures feet 10 are shown which are fastened on a base board 3b of the lower plate 3 to allow the appliance 1 to be anchored to a supporting surface; likewise it is possible to provide in other embodiments fastening solutions different from those shown therein not as a limitation (but merely as an example) such as for example a single foot placed in the center of such board, or also movable hooking systems to allow the appliance 1 to possibly move with respect to supporting structures.

Figure 6:
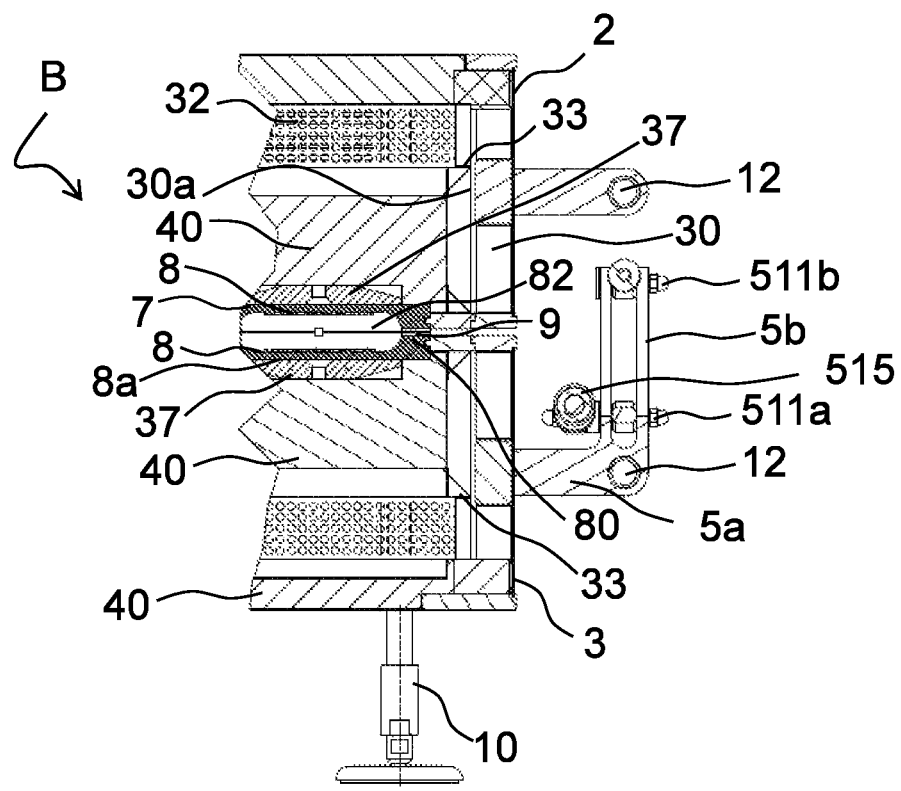
FIG. 6 is an enlarged detail of FIG. 5.
Figure 7:
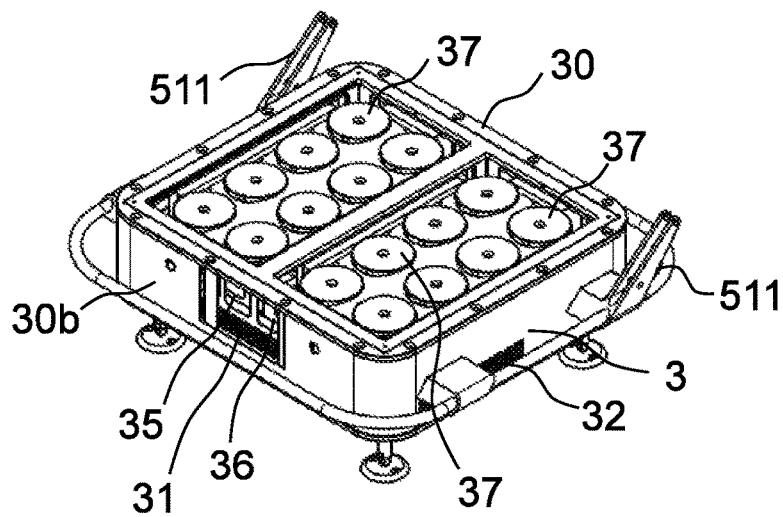
FIG. 7 is a general view of a constructional detail of the appliance according to the invention.
Figure 8:
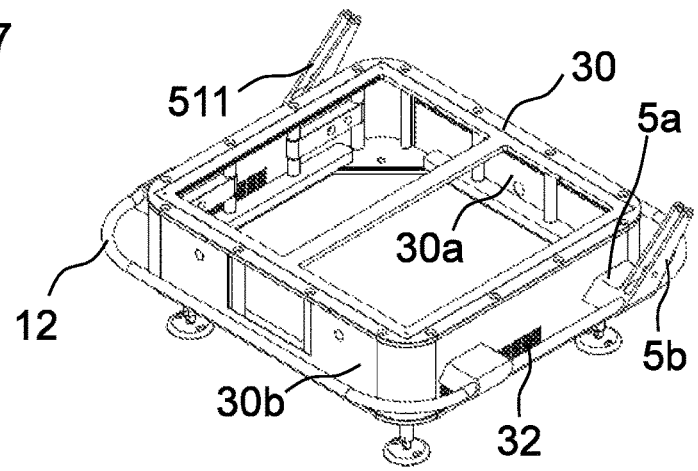
FIG. 8 is a first detail of the constructional detail of FIG. 7.
Figure 9:
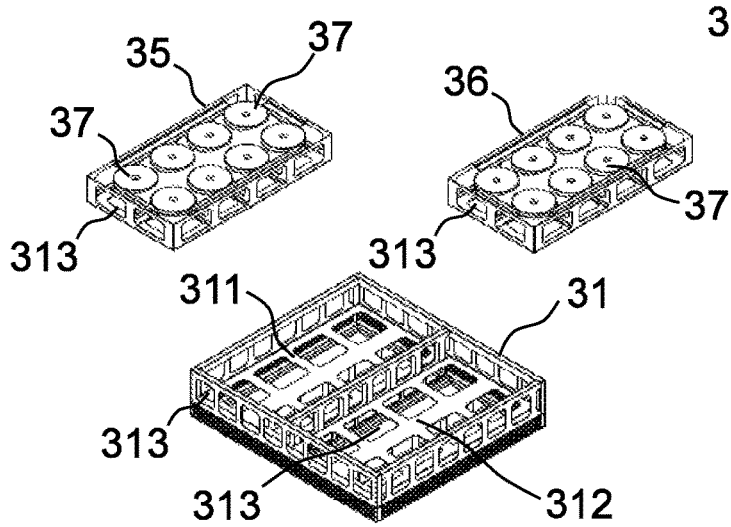
FIG. 9 is a second detail of the constructional detail of FIG. 7.

FIGS. 7, 8 and 9 show the lower plate 3, that—identically to the upper plate 2—provides a peripheral frame 30, for example made of sheet, intended to house an inner frame 31 and provided, along some portions, with perforated grids 32 to allow the inner part of the plate 3 to be in fluid communication with the outside thereof. The inner frame 31 has the same geometry of the peripheral frame 30, it is housed therein and it is fastened to the inner walls 30a thereof by means of connecting brackets 33. Connecting brackets 33—visible in FIGS. 5 and 6—are made such that between the inner frame 31 and the peripheral frame 30 a hollow space 34 is provided intended to allow air to flow.

The inner frame 31 is further provided, in this embodiment, with a first 311 and a second 312 housing intended to receive respectively a first 35 and a second 36 supporting module, on each of which a plurality of heating elements 37, preferably electric ones, are fastened.

Figure 5:
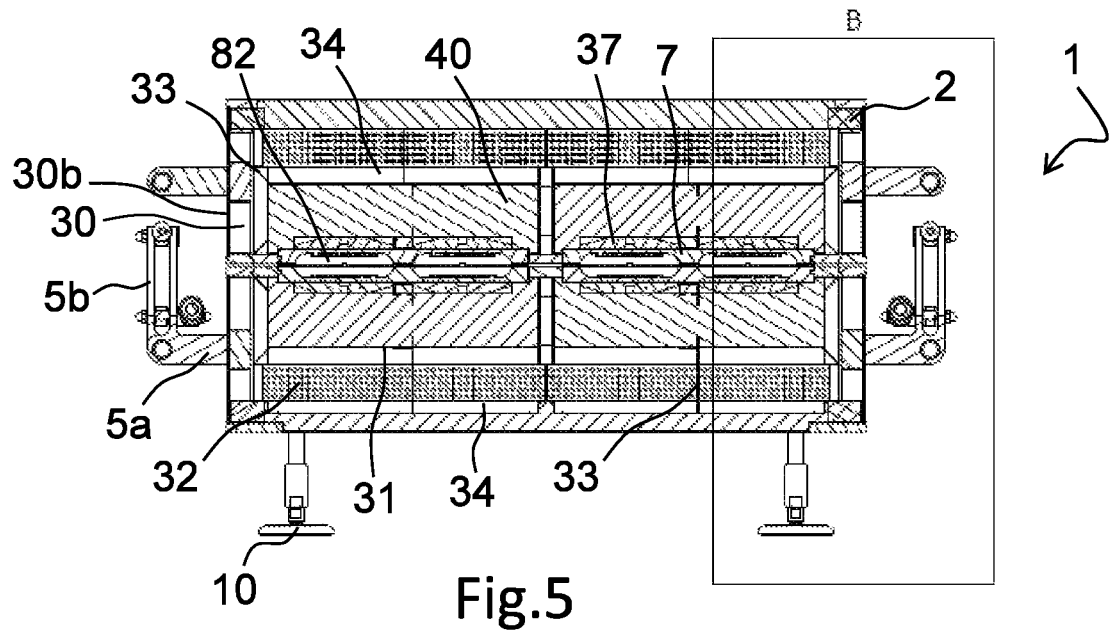
FIG. 5 is a view along a side section and in closed condition of the appliance according to the invention.

As visible in FIG. 9, both the inner frame 31 and the supporting modules 35, 36 have a structure provided with holes 313, in order to make easy to house appropriate electrical components necessary to operate the appliance 1 and to house insulating material 40—visible in FIGS. 5 and 6. The insulating material allows the first 35 and second 36 supporting modules to be thermally insulated from each other and allows loss of heat generated by the plurality of heating elements 37 to be limited towards the peripheral frame 30. To his end further insulating material is arranged near the bottom of the lower plate 3 and of the upper plate 2.

In a preferred embodiment, each heating element 37 is a coil resistance, connected to and driven by a control unit—not visible in figures—the latter being connected to a control dashboard 6 (visible in FIGS. 1 and 2). The control unit is intended to control the switching on, off and operating parameters of the individual heating elements 37, allowing the appliance 1 to be used according to different operating modes. For example an operating mode can provide to alternatively operate heating elements of the first supporting module 35 or those of the second supporting module 36, or a different operating mode provides them to be operated at the same time.

Anyway, advantageously, the control unit is provided with a control algorithm allowing each individual heating element 37 to be controlled.

Thus, once the first supporting module 35 (but likewise the second supporting module 36 or both of them) reaches the desired operating temperature, which can be detected by arranging—for example—at least one temperature sensor, the control unit switches on and/or off selectively one or more of the heating elements 37 such to exploit thermal inertia thereof to allow the appliance 1 to maintain the operating temperature, and therefore to reduce electric power absorbed by the latter to operate.

With reference to FIGS. 5 and 6, at each supporting module 35, 36 of the lower heating plate 3 and upper heating plate 2 a half-mold 7 is removably fastened.

Preferably on each half-mold 7 one or more concave portions or cavities 8 are obtained such that the cavities of the lower heating plate 3 face the cavities of the upper plate 2 in the closed and operating condition.

At the cavities 8, the outer surface 8a of the relevant half-mold 7 is in contact with a corresponding heating element 37 such that the heat generated by the latter is transmitted by conduction to the half-mold 7.

In variant embodiments, cavities 8 however can be obtained also only on one of the respective half-molds 7 of the upper 2 or lower 3 plate, provided that the outer surface 8a of the half-mold not provided with cavities is anyway in contact with a heating element 37.

Anyway the volume generated by the cavities 8 with the plates in the closed condition is intended to house food to be cooked.

It has to be noted that the peripheral edge 80 of each cavity peripherally surrounds it.

It is suitable to set forth that, although in the example shown in figures the cavities 8 have a substantially circular geometry, in variant embodiments they can have different shapes.

As visible in FIGS. 5 and 6 when the upper heating plate 2 is in the closed position, it is overlapped and in contact with the lower heating plate 3. Particularly their contact is preferably a continuous contact occurring between corresponding peripheral edges 80 of the cavities 8 of the half-molds 7 of the upper heating plate 2 and lower heating plate 3. Thus the corresponding cavities 8 form each one a closed or substantially closed cooking chamber 82 for the food, where the heat, by conduction, is transferred both upwardly and downwardly from each heating element 37.

Moreover at the peripheral edge 80 of each cavity 8, at least one vent channel 9 is formed, that allows for a fluid communication between the cooking chamber 82 composed of the cavities 8 and an environment outside the appliance 1, when the plates 2, 3 are in closed position.

Thus the possibility of undesired changes in pressure conditions, and therefore in temperature is reduced, inside the cooking chamber 82 due to gases from food.

Particularly and with reference to FIGS. 2, 5 and 6 the vent channel 9 is a channel developing in the contact region of the edges, it being formed, preferably partially on a peripheral edge of a half-mold 7 and partially on the other one (however in an equivalent manner it may be formed only on one of them).

Preferably the vent channel 9 is a channel developing parallel to the plane containing the surface of the peripheral edges 80 of the cavities 8 of the half-molds 7 of the first 3*a*- or second 2*a*-cooking surface, and it extends from the surface of the peripheral edge 80 of the cavity 8 for a depth lower than the depth of the concavity of the cavity.

The vent channel 9 can be more than one for each cavity 8, and can put adjacent cavities of a respective half-mold 7 in fluid communication with one another.

Figure 3:
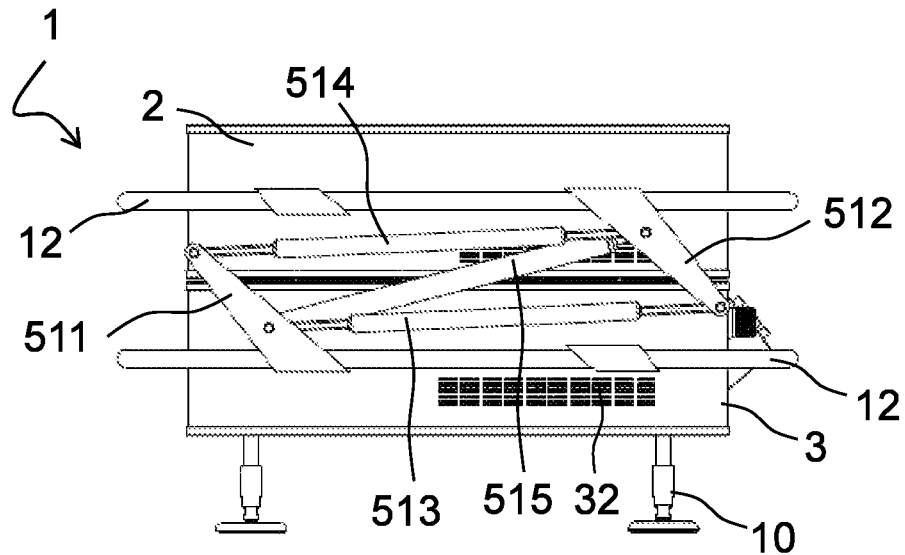
FIG. 3 is a side view in closed condition of the appliance according to the invention.
Figure 4:
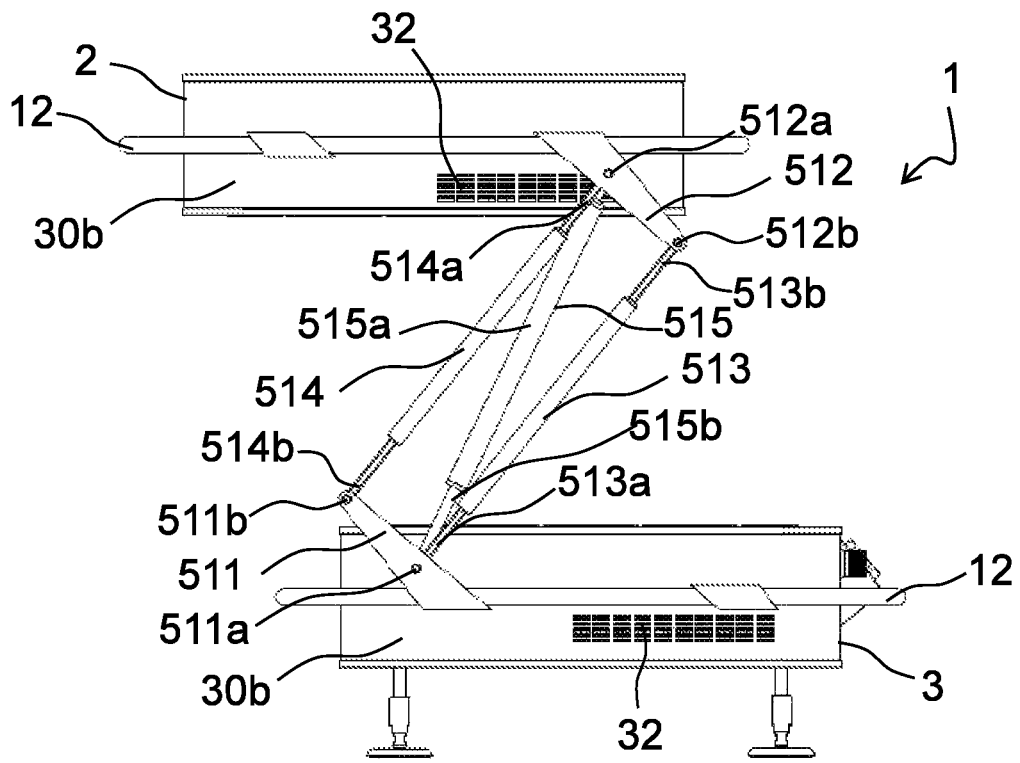
FIG. 4 is a side view in open condition of the appliance according to the invention.

With reference to FIGS. 2, 3 and 4 and in a preferred embodiment, parallelogram linkage means 5 comprise a first 51 and second 52 parallelogram linkage, intended to connect corresponding opposite sides of a outer wall 30*b* of the peripheral frame 30 of the upper plate 2 and lower plate 3 respectively. In variant embodiments it is however possible to provide only one parallelogram linkage connecting corresponding sides of the peripheral frame 30 of the upper plate 2 and lower plate 3.

As said above, the parallelogram linkage 5 allows the upper plate 2 to move with respect to the lower plate 3 such that the first 3*a* and second 2*a* cooking surfaces, and therefore also the corresponding half-molds 7, are always faced parallel each other, also when passing from closed to open condition.

More in details, the first 51—or identically the second parallelogram linkage 52—comprises a first arm 511 fastened to one end of a side of the outer wall 30*b* of the peripheral frame 30 of the lower plate 3.

The parallelogram linkage then comprises a second arm 512 fastened to an opposite end of a corresponding side of the outer wall 30*b* of the upper heating plate 2 and the first 511 and second 512 arms are both connected to a first rod 513 and second rod 514, parallel to each other and whose ends are each one hinged with the first 511 and second 512 arms.

Rods 513 and 514 are preferably telescopic rods, equipped with two portions which can slide one inside the other, thus ends of each rod are at a variable (not fixed) distance from each other.

In the shown examples, and such as better seen in FIGS. 5 and 6, the first 511 and second 512 arms comprise each one a first portion 5*a* protruding orthogonally from a respective side of the outer wall 30*b* of the peripheral frame 30 and a second portion 5*b* developing parallel to the latter. The first portion 5*a* is optionally passed through by a tubular handle 12 peripherally surrounding the frame 30 and that allows a user to lift the upper heating plate 2; in other embodiments the lifting and movement handle on the contrary is separated from the parallelogram linkages.

Particularly the second portion 5*b* of the first 511 and second 512 arm comprise each one a lower pin 511*a*, 512*b* and an upper pin 511*b*,512*b* respectively to allow each rod 513, 514 to pivot.

Ends 513*a*, 513*b* of the first rod 513 are coupled to the lower pin 511*a* of the first arm 511 and to the upper pin 512*b* of the second arm 512 respectively, and the ends 514*b*, 514*a* of the second rod 514 are coupled to the upper pin 511*b* of the first arm 511 and to the lower pin 512*b* of the second arm 512 respectively.

Then the parallelogram linkage 5 comprises a further rod 515, connected to the opposite vertices of the parallelogram linkage, specifically those joining the end of a rod with a plate and the end of the other rod with the other plate.

The rod 515 comprises an elastic element, for example a helical spring—not shown in figures—intended to allow contact pressure between upper heating plate 2 and lower heating plate 3 to be adjusted when in closed condition.

To this end also the rod 515 is telescopic and comprises a cylinder 515*a* wherein a plunger 515*b* moves driven by the spring.

The spring preferably is a variable calibration spring and to this end provides elements for adjusting its preloading, intended to change (in the case of helical spring) the length of the spring.

In the embodiment shown in figures, the rod 515 housing the spring is free to rotate by one end (specifically the end related to the plunger 515*b*) about the lower pin 511*a* of the first arm 511 and by the other end (specifically the end related to cylinder 515*a*) about the lower pin 512*a* of the second arm 512.

When cooking, depending on the temperature reached by the food being cooked and on the food type, the gas volume produced thereby can be such that it cannot go out completely through the vent channel 9.

When such situation takes place the pressure in the cooking chamber 82 tends to increase: in this case the resistance offered by the spring allows the upper plate 2 to be lifted from the lower plate 3, upon reaching a pressure threshold value reached by cooking gases inside the cooking chamber 82.

Since such pressure is also related to temperature, it is possible to say also that the movement lifting the upper plate 2 from the lower plate 3, is obtained also upon reaching a pressure threshold value reached by cooking gases inside the cooking chamber 82.

Thus, it is possible to maintain inside the cooking chambers 82 pressure (and temperature) conditions allowing food therein to be uniformly cooked.

Once the pressure inside chambers is such to exert a force able to overcome the closing force exerted by the spring, the upper plate moves away from the lower plate and thus it opens the chambers to the outer environment, allowing gas pressure to be discharged in the environment.

Once the consequent pressure reduction is obtained, therefore plates under the spring force tend to close such to recover optimal cooking conditions, till possibly reaching such an inner pressure threshold to repeat the operations just described.

Moreover between the closed position and the opening position, by the provision of the parallelogram linkage 5 and of the rod 515 with relevant spring, the upper plate 2 is movable in at least one intermediate position, corresponding to an unstable balance position of the upper plate 2.

The spring, once overcoming such intermediate position, allows the upper plate 2 and lower plate 3 to be maintained spaced from each other,—therefore without the help of a manual action to keep them spaced apart—and as long as such intermediate position is not reached, it allows the upper plate 2 and the lower plate 3 to be maintained firmly closed, till, obviously, the gas pressure inside the cooking chambers 82 reaches the threshold value.

Another aspect of the present invention is about a method for cooking food by an appliance provided with two heating plates and of which at least one is movable with respect to the other one.

The coupling of the two heating plates forms the cooking chambers 82 intended to house food to be cooked, and the method provides, when cooking food, the step of moving away from each other the two plates while maintaining them parallel when a threshold value of the pressure inside the cooking chambers is reached, such to open them towards an environment outside the appliance.

Once the inner pressure value inside the cooking chambers is below the threshold value, the method provides the two plates to approach each other again such to be closed and to recover optimal pressure conditions and, therefore, optimal temperature conditions inside the chambers 82.

From the description above it is clear how the described appliance allows above objects to be achieved.

Therefore, it is clear to a person skilled in the art that it is possible to make changes and variants to the solution described with reference to the figures set forth above without, for this reason, departing from the scope of protection of the present patent as defined by the annexed claims.

For example, in a constructional variant the rod 515 housing the spring can be connected by one end about the upper pin 511b of the first arm 511 and by the other end about the upper pin 512b of the second arm 512.

Again, in order to allow plates to move away from each other in a parallel manner upon reaching a specific pressure value, it is possible to use means different from the parallelogram means described above. For example it is possible to provide to use one or more plungers, preferably mounted orthogonal to the plates, allowing the upper plate to be lifted and lowered while maintaining it parallel to the lower plate. Similarly to the example described above, the thrust of the plungers is opposed by a spring, such that plates open upon reaching a specific pressure value inside the cooking chambers. Although this is less preferable than the parallelogram linkage solution, also such solution can work.

Generally therefore it is possible to provide an appliance for cooking food comprising an upper heating plate and a lower heating plate, provided with surfaces facing each other; the upper heating plate being movable between a closed position where the upper and lower heating plates are in contact and an open position where the upper and lower heating plates are spaced from each other. The appliance further comprises linkage means constrained to the upper heating plate and lower heating plate, to allow the upper heating plate to be lifted from or to approach in a substantially parallel manner the lower heating plate. The appliance further comprises one or more cavities for housing food to be cooked at least at one of the surfaces of the plates and at least one vent channel intended to put the cavity/cavities in fluid communication with an environment outside the appliance, when plates are in closed position. Linkage means further comprise opening means configured for operating the linkage means and for moving plates away from each other such to allow the cavities to be opened to the external environment when gas pressure inside said cavities exceeds a threshold value.

The invention claimed is:

1. An appliance for cooking food comprising
an upper heating plate and a lower heating plate provided with surfaces facing each other, the upper heating plate being movable between a closed position in which the upper and the lower heating plates are in contact with each other and an open position in which the upper and the lower heating plates are spaced from each other,
linkage, comprising one or more plungers, constrained to the upper heating plate and to the lower heating plate to allow the upper heating plate to be lifted from or to approach in a substantially parallel manner the lower heating plate,
wherein
the appliance comprises one or more cavities for housing food to be cooked at least at one of said surfaces and at least one vent channel adapted to put said one or more cavities in fluid communication with an environment external to the appliance when plates are in said closed position, and wherein the linkage is configured to move the upper plate away from the lower plate to allow the cavities to be opened to the external environment.

2. The appliance according to claim 1, wherein the upper and lower heating plate each one comprise a peripheral frame adapted to house an inner frame, wherein the inner frame is fastened to the peripheral frame through a plurality of connecting brackets such that between the peripheral frame and inner frame there is a hollow space.

3. The appliance according to claim 2, wherein the inner frame is provided with a first and a second housing adapted to receive a first and a second supporting module respectively, a plurality of heating elements being fastened thereon, wherein at least one of said surfaces comprises a half-mold removably fastened on said first or second supporting module, and wherein said one or more cavities is formed on said half-mold and is in contact through an outer surface thereof with a respective heating element.

4. The appliance according to claim 3, wherein on each half-mold said one or more cavities is formed such that in the closed position of the upper heating plate, corresponding cavities of the respective half-molds of the upper and lower heating plate form a cooking chamber.

5. The appliance according to claim 1, wherein each one of said one or more cavities comprise a peripheral edge, and wherein, in said closed position, the contact between the upper and the lower heating plate is a continuous contact that occurs between peripheral edges of corresponding cavities of the upper and the lower heating plate.

6. The appliance according to claim 1, wherein said vent channel is a channel formed on a peripheral edge of said at least one or more cavities and extends parallel to the planes containing the facing surfaces, and wherein said vent channel enters from the peripheral edge of said at least one or more cavities for a depth smaller than the depth of the cavity itself.

7. The appliance according to claim 1, wherein said facing surfaces each one comprise a plurality of cavities, wherein each of said plurality of cavities comprises a plurality of vent channels, wherein at least one of said plurality of vent channels is adapted to put adjacent cavities of the same facing surface in fluid communication.

8. The appliance according to claim 1, further comprising a control unit adapted to control a plurality of heating elements each one in contact with a respective cavity, wherein the control unit is provided with a control algorithm that allows each individual heating element to be controlled such that when the appliance reaches a specific temperature value, the control unit switches off and/or switches on one or more of the plurality of heating elements for a time lower than the time that the appliance takes to cool down to a predetermined minimum temperature threshold.

9. An appliance for cooking food comprising:
- an upper heating plate and a lower heating plate provided with surfaces facing each other, the upper heating plate being movable between a closed position in which the upper and the lower heating plates are in contact with each other and an open position in which the upper and the lower heating plates are spaced from each other,
- linkage, comprising one or more plungers, constrained to the upper heating plate and to the lower heating plate to allow the upper heating plate to be lifted from or to approach in a substantially parallel manner the lower heating plate,
- wherein the appliance comprises one or more cavities for housing food to be cooked at least at one of said surfaces,
- and wherein the linkage is configured to move the upper plate away from the lower plate such to allow the cavities to be opened to the external environment.

10. The appliance according to claim 9, further comprising a control unit adapted to control a plurality of heating elements each one in contact with a respective cavity, wherein the control unit is provided with a control algorithm that allows each individual heating element to be controlled such that when the appliance reaches a specific temperature value, the control unit switches off and/or switches on one or more of the plurality of heating elements for a time lower than the time that the appliance takes to cool down to a predetermined minimum temperature threshold.

* * * * *